United States Patent
Goodgion et al.

[15] 3,656,470
[45] Apr. 18, 1972

[54] BASE ASSEMBLY FOR MOBILE HOME FURNACE

[72] Inventors: James C. Goodgion; Armond L. Blossom, both of Wichita, Kans.

[73] Assignee: The Coleman Company, Inc., Wichita, Kans.

[22] Filed: Mar. 2, 1970

[21] Appl. No.: 15,642

[52] U.S. Cl. .................................... 126/110 AA, 126/114
[51] Int. Cl. ............................................ F24h 3/00, F24h 9/02
[58] Field of Search .................. 126/110, 110 AA, 110 B, 116, 126/116 B, 114

[56] References Cited

UNITED STATES PATENTS

| | | | |
|---|---|---|---|
| 3,067,735 | 12/1962 | Albert | 126/110 AA |
| 3,283,753 | 11/1966 | Bodett et al. | 126/110 AA |
| 3,386,434 | 6/1968 | Castello et al. | 126/114 |

FOREIGN PATENTS OR APPLICATIONS 683,420  3/1964  Canada .......................... 126/110 AA

*Primary Examiner*—Charles J. Myhre
*Attorney*—Dawson, Tilton, Fallon & Lungmus

[57] ABSTRACT

A base assembly for a downflow mobile home furnace provides an upper compartment for an air cooling coil, and a smaller base compartment, connecting duct means extending through the lower compartment and providing a perimetric space therearound. Make-up air chute means is positionable to extend downwardly from a selected side of the perimetric space, and the casing around the space provides openings for the make-up air to exit and flow upwardly around the sides of the casing as installed in an alcove or closet. Preferably, the assembly also includes a floor plate slidably receiving the casing and extending inwardly to provide the air chute mounting means on a plurality of sides thereof. The refrigerant tube means can extend through the base compartment selectively along any side thereof, the make-up air duct means terminating at the bottom of the base compartment, thereby permitting the refrigerant tubes to run over the top of the air chute if necessary.

6 Claims, 9 Drawing Figures

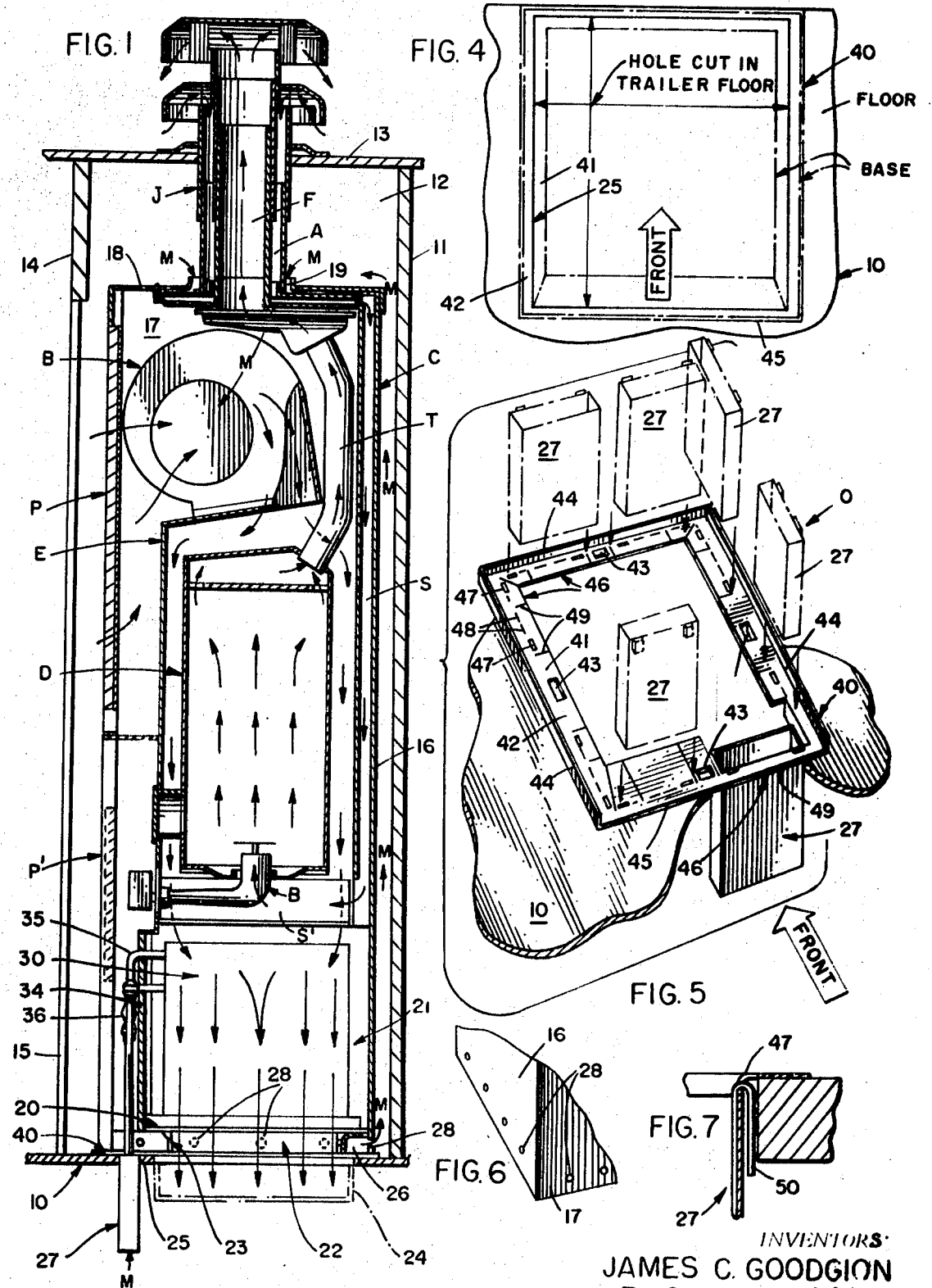

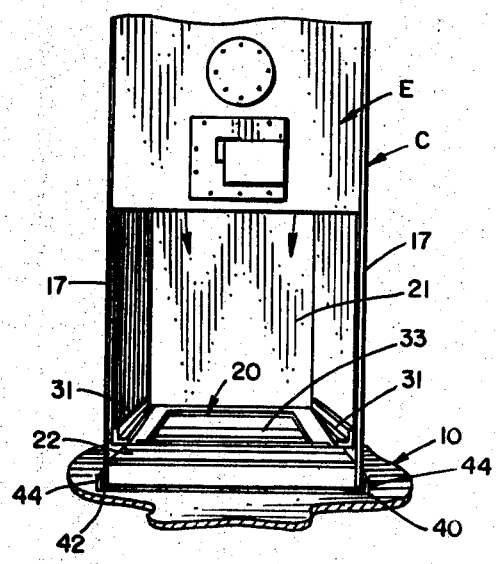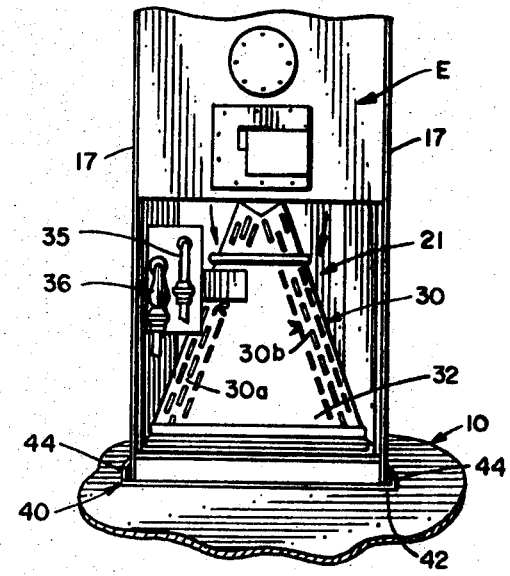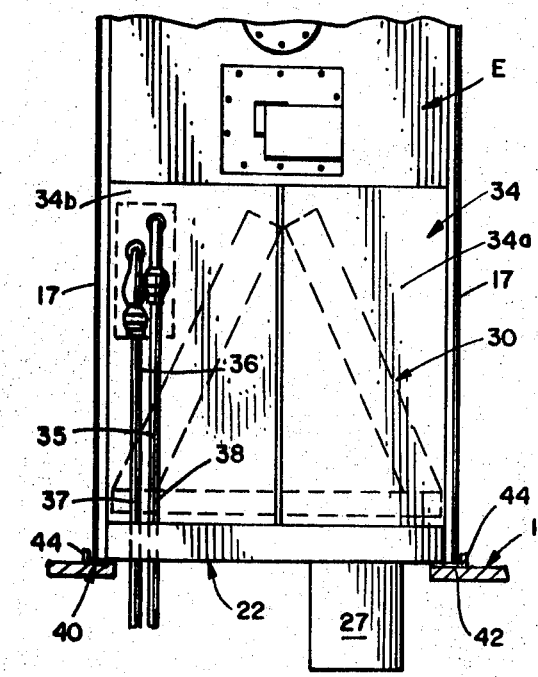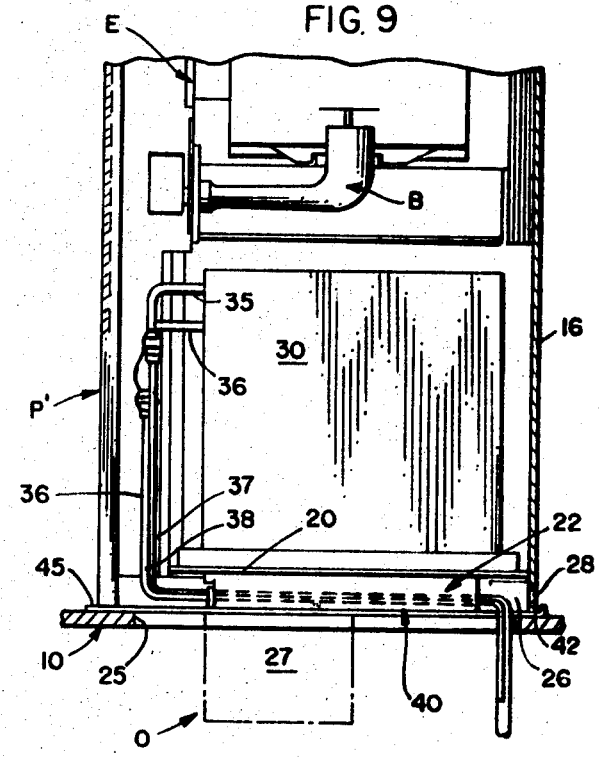

BASE ASSEMBLY FOR MOBILE HOME FURNACE

BACKGROUND AND SUMMARY

Forced air mobile home furnaces, both gas and oil fired, have been known and in use for many years. Such furnaces are installed as original equipment by the mobile home manufacturers. The time and expense required to install such furnaces is therefore a prime consideration. Since manufacturers of mobile home furnaces sell to many different mobilehome manufacturers, it is not possible to exactly correlate the design of the furnace or its method of installation with the design or floor plan of a particular mobile home. The objective of the furnace manufacturers has therefore been to provide a design which is adapted for universal installation being relatively simple and easy to install by all mobile home manufacturers.

Installation problems are further complicated when the mobile home is also to be equipped with an air cooling unit. If the air cooling unit is contained in a separate casing from the furnace, duplicate installation costs may be involved. In recent years, some manufacturers of mobile homes have provided air cooling units, which can be mounted on the floor of the mobile home, and the mobile home furnace mounted on top of the air cooling unit. This procedure is an improvement over separately mounted and installed furnace and air cooling units, but it still involves additional installation costs. It has therefore been desired to provide unitary air heating and cooling units for mobile homes, which are housed in a single casing, and which can be installed as a single unit. However, the national market territories of mobile home manufacturers require that the manufacturer be given a choice between including or omitting the air cooling unit, and/or varying the size and capacity of the air cooling unit, depending upon the part of the United States in which the mobile home is to be marketed.

Where the mobile home furnace is of the downflow type, the treated air (either heated or cooled) is discharged from the bottom of the furnace, and is passed into the distribution duct system of the mobile home, at least a portion of which may be mounted below the floor of the mobile home. Means must therefore be provided for connecting the air outlet of the furnace through the floor to the distribution duct system, which permits the necessary installation connection to be made with minimum time and expense. A closely related installation problem is the need to provide make-up air. Under existing regulations, as well as from the standpoint of good engineering practice, the air being heated or cooled in the furnace unit should include a portion of outside or fresh air, although the larger volume of the air is being recirculated from within the mobile home. Consequently, it has been the practice to provide an intake for outside air, which communicates with the air intake to the blower of the furnace. Commonly, the air intake has been located in the floor of the mobile home, extending through the floor and into the closet or alcove space surrounding the outside of the furnace as installed.

The foregoing problems and difficulties are substantially overcome by the base assembly combination of the present invention, which is designed for use with a downflow mobile home furnace, which incorporates at least optionally, an air cooling means, both the air heating and cooling units being housed within a single casing, which can be installed as an integrated unit. The base assembly includes a platform support means mounted within the lower portion of the furnace casing and dividing the downflow air space into an upper compartment and a base compartment. Connecting duct means extends from the larger upper compartment through the central portion of the base compartment with its sides spaced inwardly from the sides of the casing to provide a perimetric space therearound. The make-up air chute is positionable to extend downwardly from a side of the perimetric space, and the casing walls surrounding the perimetric space are provided with air outlet openings communicating with the lower portion of the closet or alcove in which the furnace is installed. The air can then flow upwardly around the outside of the casing for entry to a top air intake, which communicates with the intakes of the furnace blower.

In a preferred embodiment the refrigerant tubes which supply and remove refrigerant from the cooling coil installed within the upper compartment of the base assembly are arranged to extend through the perimetric space of the base compartment, and then upwardly therefrom to the cooling coil. Optionally, the refrigerant tube means can extend along any side of the base compartment, and even over the top of the make-up air chute, which is preferably arranged to terminate at the bottom of the base compartment, thereby leaving the space thereabove open and unobstructed.

In the preferred form of the upper compartment and platform support means, the upper compartment is provided with a removable closure panel on its front side. The platform support means provides slidable tracks which extend inwardly from the front side of the compartment and are arranged to provide for the slidable insertion and removal of the air cooling coil means. This permits the air cooling coil to be installed, as required, by the mobile home manufacturer. In other words, the air cooling coil can be omitted, or air cooling coils of different sizes can be installed. Moreover, if the air cooling coil requires servicing or repair, after the mobile home is in use, it can be easily removed, and taken to a refrigeration repair center.

For universal installation, it is preferred that the make-up air chute be selectively positionable in a plurality of positions around the sides of the base compartment. Advantageously, at least one installation position should be provided on each of the four sides, and optimally at least two installation positions on each of the four sides. To accomplish this result, and to provide other installation advantages, the base assembly preferably also includes a perimetric floor plate disposed beneath the lower ends of the side walls of the furnace casing. The plate means can provide perimetric portions extending around both the inside and the outside of the casing. Retaining flange means can project upwardly on three sides of the plate means from the perimetric outer portion leaving one side open so that the casing can be slide onto the plate means over the unflanged side. Air chute mounting means is provided by the perimetric inner portion of the plate means on a plurality of sides thereof for selective alternate mounting of the make-up air intake chute. Further features and advantages will be indicated in the following detailed specification.

DRAWINGS

The base assembly combination of this invention is illustrated in certain preferred embodiments, in the accompanying drawings, wherein FIG. 1 is a side elevational view of a downflow mobile home furnace as installed in an alcove space of a mobile home and incorporating the base assembly of the present invention, certain of the components of the furnace and base assembly being shown in vertical section for clarity of representation;

FIG. 2 is a fragmentary front perspective view of the furnace showing the interior of the cooling coil compartment with the cooling coil removed;

FIG. 3 is a fragmentary front perspective view similar to FIG. 2, the cooling coil assembly being shown in the cooling coil compartment;

FIG. 4 is a diagrammatic plan view of a portion of the floor of the mobile home, illustrating the initial steps in the installation of the furnace;

FIG. 5 is a diagrammatic perspective view of the mobile home floor section of FIG. 4, illustrating the optional mounting of the make-up air chute on the floor plate;

FIG. 6 is a fragmentary perspective view of a rear base corner of the furnace casing, showing the openings for diffusion of the make-up air into the alcove space;

FIG. 7 is a fragmentary enlarged sectional view of the support strap connections between the air chute and the base plate;

FIG. 8 is a fragmentary front elevational view of the furnace of FIG. 1, illustrating the relation of the base plate to the casing and the floor and the relative position of the make-up air chute; and FIG. 9 is a fragmentary side elevational view of the furnace of FIG. 1, illustrating a different position for the make-up air chute and the refrigerant tubing in the base compartment of the furnace.

DESCRIPTION OF PREFERRED EMBODIMENTS

Reference may first be had to FIG. 1 which illustrates a downflow mobile home furnace of the kind with which the base assembly of this invention can advantageously be employed. The particular furnace illustrated is described in detail in copending application of James C. Goodgion, entitled "Mobile Home Furnace with Make-Up Air Supply Means," being Ser. No. 9,263, filed Feb. 6, 1970. In general, the furnace includes an exterior casing C having vertically extending walls, which may be formed of sheet metal, including rear, side and top walls, and a front wall including openable louver door panels P and P'. Within the heater is a drum D which provides a combustion chamber and radiator, a burner B being located in the bottom of the chamber, and supplied with combustion air through a sealed passage S which communicates with the annular combustion air passage A of the concentric pipe roof jack J. As will be noted, the flow of combustion air is indicated by the arrows in passages A and S. The hot combustion gases exit at the top of drum D through a flue tube T which connects with the flue pipe F of the roof jack J. This flow is also indicated by the arrows in drum D, tube T, and flue F.

A box-shaped air treating enclosure E provides a jacket around drum D and is spaced therefrom to provide downflow air passages thereabound. On the top of enclosure E is mounted a squirrel cage suction blower B, which draws air primarily from the interior of the mobile home through the louver panel P. As indicated by the arrows, the air discharge from the blower B passes downwardly around drum D in the space between the drum and the enclosure E, and flows downwardly below the level of burner B, flowing around the sides of the transverse portion S', of the combustion air supply duct.

As shown in FIG. 1, the furnace is installed within a closet or alcove space defined by a floor 10, a rear wall 11, side walls 12, a ceiling or top wall 13, and a front door wall 14, the door 15 being indicated diagrammatically. An air space is provided around the sides and top of the casing C within the closet or alcove, the furnace rear wall 16 being spaced from the alcove rear wall 11, the furnace side walls 17 and the alcove side walls 12, and the furnace top wall 18 from the alcove top wall 13. In addition, space will usually be provided between the furnace front wall, comprising panels P, P', and the alcove door wall 14, 15. Not only does the spacing of the casing C from the walls and top of the alcove serve to insulate the alcove from the heat generated by the furnace, but it also serves the purpose of providing a passage for the flow of make-up fresh air from beneath the floor of the mobile home to a make-up air intake in the top of the furnace casing. In illustration given, as described more fully in the above-cited copending application, the make-up air intake in top wall 18 is in the form of an annular passage 19 located at the base of flue jack J, which permits make-up air to be drawn in from the upper portion of the alcove space to the intake of blower B, thereby combining a proportion of make-up air with the recirculated room air from within the mobile home. The means of the present invention for supplying the make-up air to the lower portion of the alcove space will be subsequently described, since it forms a preferred part of the base assembly of this invention.

Referring now to preferred components of the base assembly of this invention, as shown somewhat diagramatically in FIG. 1, there is the platform support 20 which is mounted within the lower portion of casing C and divides the downflow air space therein into an upper compartment 21 and a lower or base compartment 22. As shown, the upper compartment 21 is of large size relative to the base compartment 22, the compartment 21 being designed to receive a cooling coil assembly, as will subsequently be described.

Connecting duct means designated generally by the number 23 extends downwardly from upper compartment 21 through the central portion of the base compartment 22 for communicating with the distribution duct 24 of the mobile home air distribution system. In the illustration given, the duct 24 is mounted below the floor 10, the connecting duct 23 communicating with the duct 24 through an opening 25 in the floor. The sides of the connecting duct 23 are spaced inwardly from the adjacent sides of casing C to provide a perimetric space 26 therearound.

A make-up air chute 27 extends downwardly from space 26 through floor opening 25. The flow of the make-up air is indicated by the arrows marked with the letter M enclosed in a circle. As indicated, the make-up air enters the bottom of the chute 27 beneath the floor 10, flows upwardly into the perimetric space 26 and out through the ports 28, flowing upwardly in the alcove, and finally into the make-up air intake 19. In FIG. 6, the openings or ports 28 are shown from the outside of the casing, the openings being provided in the lower portion of the rear wall 16 and in the lower portions of the side wall 17 at the level of the perimetric space 26, and providing communication between this space and the exterior of the casing C within the closet or alcove.

Looking now at FIGS. 2 and 3, the lower portion of the furnace casing is shown from the front with the interior of the cooling coil compartment 21 exposed. The platform support 20 can be seen most clearly in FIG. 2. As shown, it consists of a perimetric frame, which is secured to the casing C. The sides are provided with a pair of slide tracks 31 for slidably receiving and supporting the cooling coil 30, as indicated in FIG. 3. The cooling coil unit can consist of a V-shaped assembly mounted on a base 32, which is received by the tracks 31. This permits the cooling coil assembly 30 to be inserted and removed from the compartment 21. The downflowing air enters the top of compartment 21, passing around the sides of the transverse duct S', as indicated by the arrows in FIGS. 2 and 3. The air then flows downwardly through the inclined coils 30a and 30b, and passes out of compartment 21 through the opening 33, which is defined by the parametric platform support 20 (see FIG. 2). With this arrangement, the furnace can be utilized with no cooling coil within the compartment 21, or cooling coils of lesser or greater capacity can be selectively inserted, as required by the contemplated conditions of use. As indicated in FIG. 8, the front of compartment 21 can be closed by a panel or door assembly 23 consisting of a pair of removable panel sections 34a and 34b. It will be understood that these panel sections will be in place during use of the furnace, since compartment 21 provides a downflow air space, which discharges through base compartment 28 to the distribution 24.

As shown more clearly in FIGS. 8 and 9, the installed cooling coil unit 30 is provided at its front with tube connectors 35 and 36, which respectively connect to refrigerant tubes 37 and 38. The refrigerant tube means 37, 38 are arranged to extend through the base compartment 22 to a point below floor 10, as shown in FIGS. 1, 8 and 9. Optionally, the refrigerant tube means can extend straight downwardly, as indicated in FIG. 1 and shown more clearly in FIG. 8, or the tubes can be run through one or more sides of the perimetric space 26 to a more convenient position for extending through the floor 10, as shown in FIG. 9.

For use in combination with the base assembly components described above, it is preferred to employ a floor plate 40, the floor plate is preferably in the form of a perimetric frame, and is disposed horizontally beneath the bottom of the furnace casing C, as indicated in FIGS. 1 to 3 and 8 to 9. In the preferred embodiment, the floor plate 40 not only provides for the installation and positioning of the furnace, but also provides a means for positioning and supporting the make-up air chute 24 in a selected position beneath the perimetric air space 26. The preferred method of employing the plate means 40 is shown more clearly in FIGS. 4 and 5.

When installing the furnace on the floor 10, a rectilinear opening (square or rectangular) 25 can be cut in the floor. This opening is sized so that its dimensions are between the internal and external dimensions of the frame 40, thereby permitting the frame to be superimposed thereon, as shown in FIG. 4, with a portion 41 extending inwardly and overlying the opening 25, and a portion 42 extending outwardly and overlying the floor 10. When the plate 40 has been positioned in this manner, the tabs 43 are bent downwardly in facing relation to the respective side edges of the opening 25, thereby maintaining the plate 40 in the desired relation to the opening 25.

The outer perimetric portion 42 of the plate 40 is dimensioned to extend outwardly slightly beyond the sides of casing C as shown in FIGS. 2, 3, 8 and 9. The outer edges of the plate portion 42, on three sides of the plate, can be provided with upwardly extending flange means 44. One side of the frame 40, comprising the front 45 is left open and unflanged so that the furnace casing C can be slid onto the floor plate 40 over its front. In other words, after the plate 40 has been installed, as illustrated in FIGS. 4 and 5, the furnace is slid onto the plate over the front 45 until the relationship shown in FIG. 1 is obtained.

Before the furnace is mounted on the floor plate 40, the air chute 27 should be installed. For this purpose, as shown more clearly in FIG. 5, the perimetric inner portion 41 of the floor plate, which extends inwardly of the casing C and overlies the outer portion of the floor opening 25 can be provided with a plurality of foldable or removable mounting flange sections designated generally in FIG. 5 with the number 46. In the illustration given, each side of the plate is provided with two of the mounting sections 45, one being located on each side of the central centering tabs 43. The mounting sections consist of a pair of longitudinally spaced mounting slots 47 connected by fold or score lines 48. Transversely extending cuts may be provided, as indicated at 49 to assist in folding down the flange portions along the lines defined by the scores 48. When the flanges have been folded down, as shown in the lower right hand corner of FIG. 5, a receptacle is provided for receiving the chute 27. The chute 27 may be positioned with its upper end at the level of the plate 40 and immediately adjacent to the downwardly extending flange portions. To assist in hanging the chute 27 on the plate 40, the outer side of the chute can be provided with a pair of hooks 50 as shown in FIG. 7, the hooks extending through the slots 47. It will be understood that other mounting means can be provided. With the construction illustrated, the chute 40 can be mounted in either one or two selected positions on each side of the plate 40, thereby providing for great flexibility in installation.

Correlating the figures, if the chute 27 is installed in the position shown in solid lines in FIG. 5, it will occupy the position also shown in FIGS. 1 and 8. If an optional position is adopted, such as the position indicated by O in FIG. 5, the chute when installed will have the approximate position shown in FIG. 9. In any selected position of the chute 27, the refrigerant tube means 37, 38 can extend over the top thereof through the space 26, as shown in FIG. 9. In other words, the top of the chute 27 in its normal use position communicates with the bottom of the adjacent portion of the perimetric space 26, leaving the adjacent space portion open for receiving the refrigerant tube means, if required. Consequently, the refrigerant tube means and the chute means can be positioned on any side of the casing without interferring with each other.

OPERATION

The operation of the base assembly combination has already been largely described. After installation of the plate 40 in relation to the floor opening 25, and the sliding of the casing C thereon, the refrigerant tubes can be run up through the opening 25 passing along any side of the space 26, as required, and then upwardly to the connections 35, 36. The make-up air chute 27 will be in place, and will be extending downwardly to below the floor 10. During the operation of the blower B, an induced air flow will occur, air being sucked in through the chute 27, passing through the space 26, outwardly through the openings 28 to the lower portion of the closet or alcove, and then to the upper portion thereof, entering the furnace casing through the make-up air opening 19, and finally combining with the recirculating room air at the intakes to the blower B. The combined make-up air and room air will then be heated or cooled, as required, and delivered to the distribution duct system 24.

We claim:

1. In a mobile home furnace having an exterior casing with vertically extending walls, the combination comprising: a perimetric floor plate for placement on a floor for slidably receiving said furnace casing and defining a central opening; platform means secured to said furnace casing and spaced above said floor plate when said furnace is in assembled relation therewith, said platform means extending inwardly of said casing and dividing the lower portion of said casing into an upper air cooling compartment and a lower compartment; a connecting duct connected to said platform means and extending downwardly thereof for communicating the interior of said upper air compartment with a distribution duct in said home beneath said furnace, said connecting duct spaced inwardly of the sides of said casing to enclose said lower compartment and to provide an inner wall for a perimetric make-up air space in combination with said floor plate, said platform means and the casing of said furnace, said furnace defining a plurality of apertures communicating said perimetric make-up air space with the interior of an alcove receiving said furnace; and chute means attachable to said floor plate for extending through the floor of said mobile home and communicating said make-up air space with the outside of said mobile home for passing outside air to said make-up air space, said perimetric make-up air space being free for routing conduits or refrigerant lines to any side of said furnace.

2. The system of claim 1 wherein said upper compartment is provided with an openable panel for access, and said casing further includes a front louvred panel spaced outwardly from said closure panel, said perimetric air space communicating through the space between said closure panel and said louvred panel with the alcove in which said furnace is installed.

3. The system of claim 1 wherein said floor plate includes a plurality of separatable flange sections extending about the interior thereof, each adapted, when separated, to provide a receptacle for receiving said make-up air chute, whereby said make-up air chute may be selectively positioned at the plurality of positions, at least one of which is adjacent each side of said casing while maintaining said perimetric make-up air space free for routing lines therethrough.

4. The system of claim 3 in which said chute means in its normal use position communicates with the bottom of the adjacent portion of said perimetric space leaving the adjacent space portion open for routing refrigerant tube lines.

5. The system of claim 1 wherein said floor plate means includes a flat peripheral portion adapted to slidably receive a furnace during installation and further includes upturned side flanges at each side and the rear for registering the bottom edge of the casing of said furnace during installation.

6. In a mobile home furnace having a casing with vertically extending walls, the combination comprising: a perimetric floor plate adapted for placement on the floor to slidably receive the casing of said furnace during installation, said floor plate including a flat peripheral inwardly extending flange to define a central opening and a plurality of removable flange portions, at least one on each side of said floor plate adjacent said opening, each flange portion providing a receptacle upon removal; an air chute including means for attachment to a receptacle of said floor plate with the upper end thereof at the level of said floor plate to communicate the perimetric space above said floor plate with the exterior of said mobile home;

platform means attached to the interior of said casing to define the upper portion of said perimetric air space above said floor plate; and a connector chute extending downwardly from said platform means through said central opening of said floor plate to provide the inner walls of said perimetric air space; said casing of said furnace providing the outer walls for at least a portion of said perimetric make-up air space above said floor plate and being provided with outlet apertures to communicate said perimetric air space with an alcove in which said furnace is installed.

* * * * *